May 16, 1972  L. W. McCONNELL  3,663,669
METHOD FOR SELECTIVELY PROJECTING REFRACTORY MATERIAL
AGAINST THE LINING OF BASIC OXYGEN FURNACES
Original Filed Jan. 6, 1969  5 Sheets-Sheet 1

INVENTOR
LEONARD W. McCONNELL
By Stanley J. Price
his Attorney

May 16, 1972 L. W. McCONNELL 3,663,669
METHOD FOR SELECTIVELY PROJECTING REFRACTORY MATERIAL
AGAINST THE LINING OF BASIC OXYGEN FURNACES
Original Filed Jan. 6, 1969
5 Sheets-Sheet 2

INVENTOR
LEONARD W. McCONNELL
By Stanley J Price
his Attorney

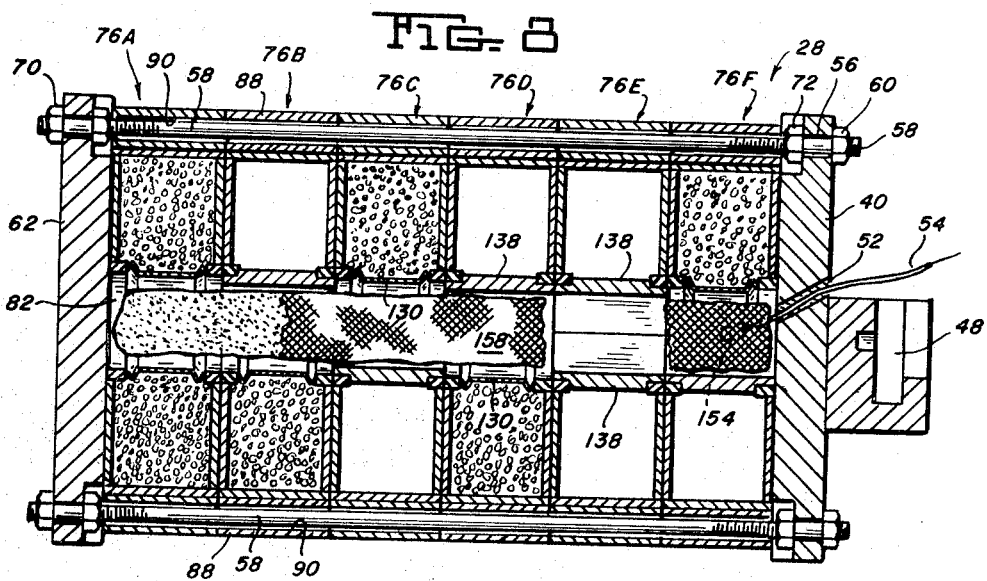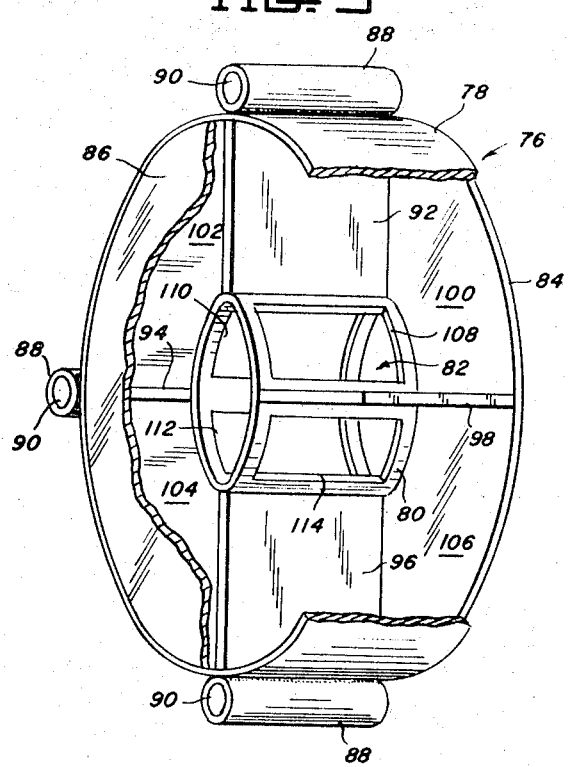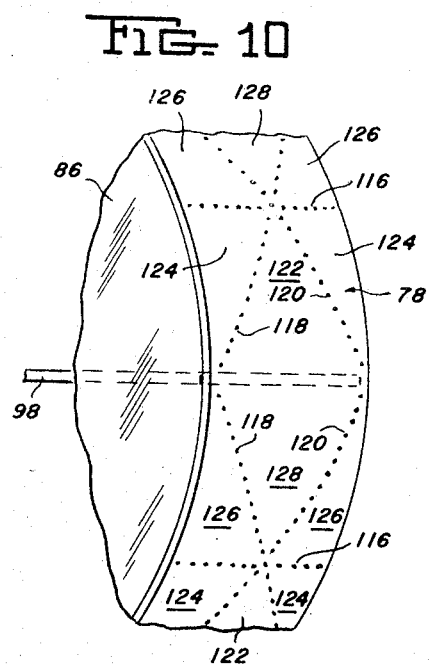

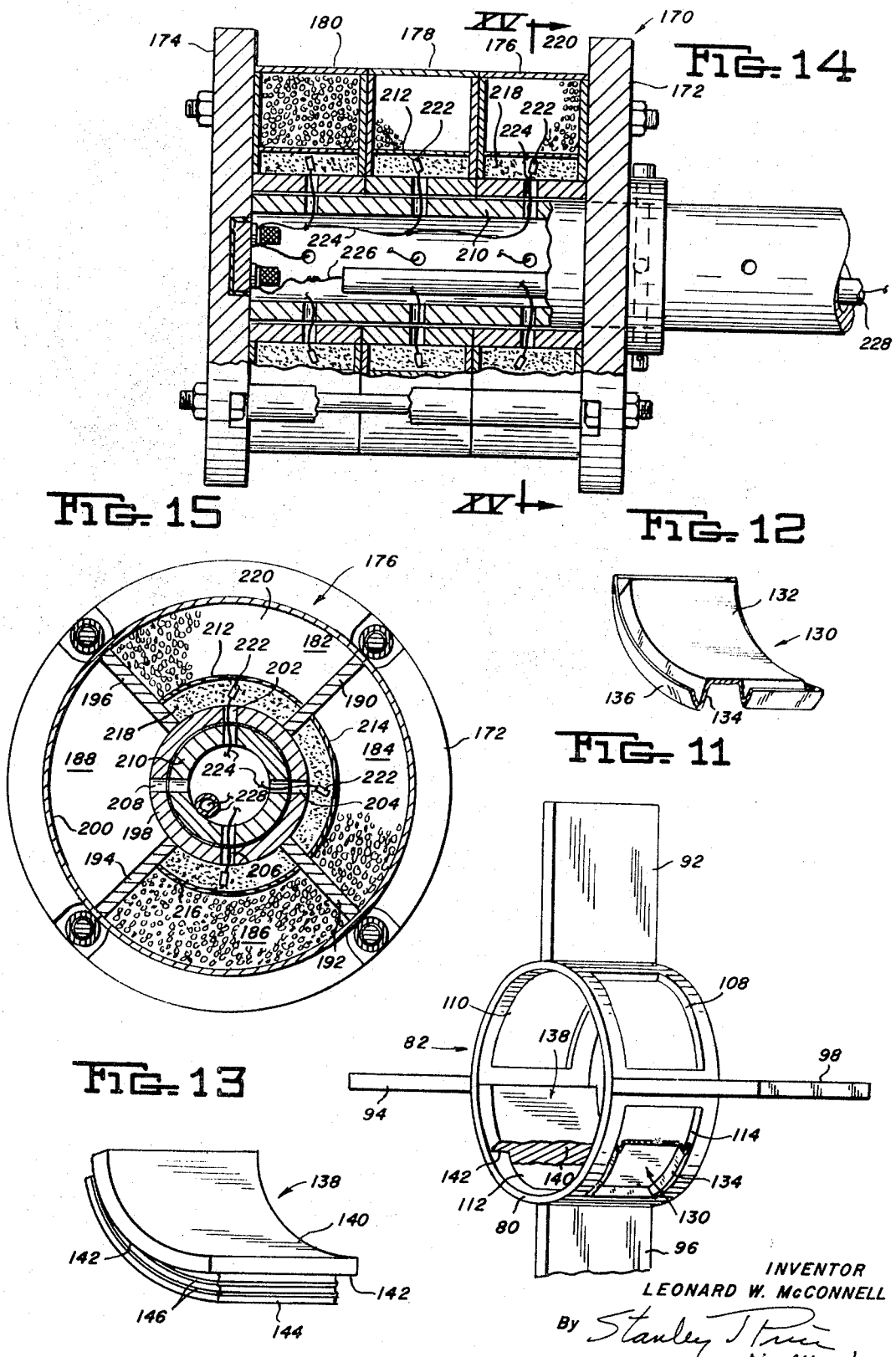

May 16, 1972  L. W. McCONNELL  3,663,669
METHOD FOR SELECTIVELY PROJECTING REFRACTORY MATERIAL
AGAINST THE LINING OF BASIC OXYGEN FURNACES
Original Filed Jan. 6, 1969  5 Sheets-Sheet 5
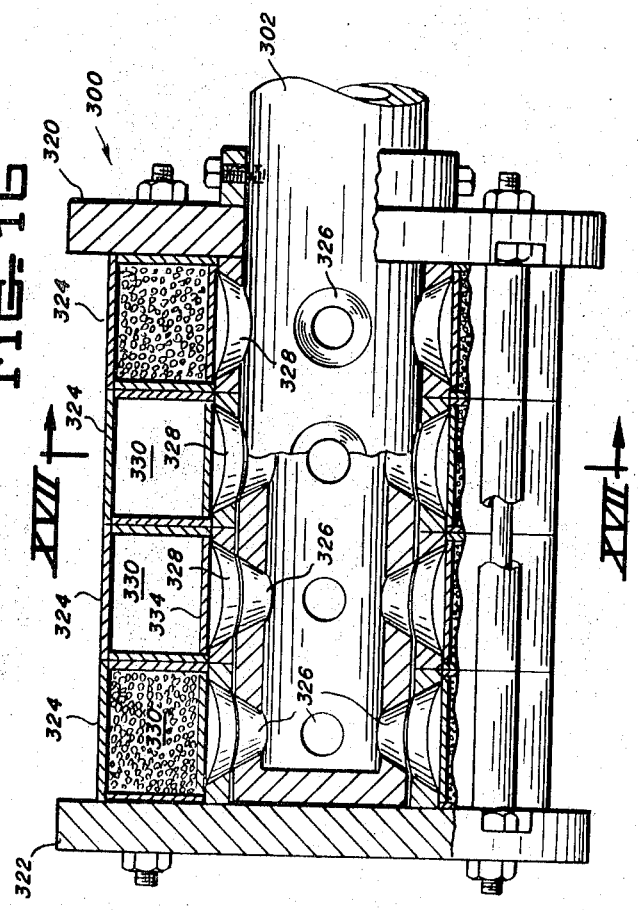
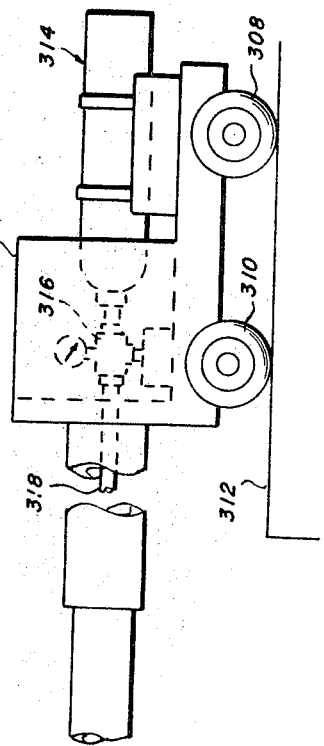
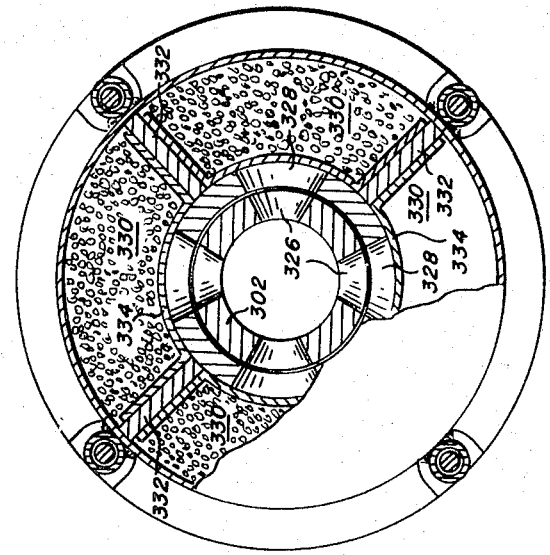
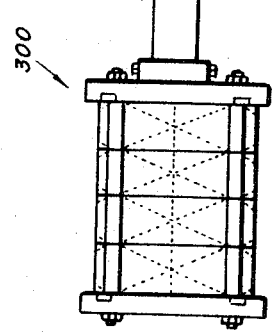
INVENTOR
LEONARD W. McCONNELL
By Stanley J Price
his Attorney

United States Patent Office 3,663,669
Patented May 16, 1972

3,663,669
METHOD FOR SELECTIVELY PROJECTING REFRACTORY MATERIAL AGAINST THE LINING OF BASIC OXYGEN FURNACES
Leonard W. McConnell, 3629 St. Davids Road,
Newtown Square, Pa. 19073
Original application Jan. 6, 1969, Ser. No. 789,202, now Patent No. 3,533,375, dated Oct. 13, 1970. Divided and this application June 24, 1970, Ser. No. 49,239
Int. Cl. F27d 1/16, 3/06
U.S. Cl. 264—30                                      3 Claims

ABSTRACT OF THE DISCLOSURE

A method for selectively applying pulverulent or granular refractory material to the worn or eroded portions of a refractory lining. A container having a plurality of compartments, each divided into separate sections or quadrants, is secured to an end of a boom that is supported by a vehicle. Pulverulent refractory material is positioned in certain of the isolated sections or quadrants of each of the compartments depending upon the areas of the furnace refractory lining that are worn and eroded so that refractory can be directed to eroded areas. The container has an axial passageway in which an explosive material is positioned. The container secured to the end of the boom is moved into a predetermined position within the furnace while the furnace is at an elevated temperature, preferably immediately after the molten metal has been tapped and slag dumped prior to charging for ensuing heat. The explosive within the axial passageway is then detonated to propel the pulverulent refractory against the wet, plastic lining. The container is fabricated so that the outer cylindrical walls, especially the sections of the segments enclosing the quadrants or sections containing the pulverulent refractory, are frangible and are ruptured, torn and bent by the force of the explosion so that the pulverulent refractory material is selectively propelled through the openings formed in the ruptured outer wall against the refractory lining. Another embodiment provides separate explosive charges in each of the quadrants filled with the refractory material that are detonated by separate detonators. A still further embodiment includes the use of a pressurized source of gas positioned externally of the vehicle.

CROSS REFERENCE TO RELATED APPLICATIONS

This application is a division of my copending application Ser. No. 789,202, filed Jan. 6, 1969, entitled "Apparatus for Selectively Projecting Refractory Material Against the Lining of Basic Oxygen Furnaces," now Pat. #3,533,-375.

BACKGROUND OF THE INVENTION

(1) Field of the invention

This invention is directed to a method for applying refractory material to portions of a refractory lining and more particularly the invention relates to a method for selectively applying refractory material to preselected portions of a refractory lining while the vessel and refractory lining are at an elevated temperature.

(2) Description of the prior art

Concentric types of furnaces, as for example, the basic oxygen furnaces, all have the same problem. The increase in the speed of the conversion process results in rapid wear and erosion of the refractory furnace lining. It has been discovered that the same wear pattern in the lining of the same basic oxygen furnace due to the abrasion, erosion and spalling occurs when the furnace is operated under substantially the same conditions.

In the past, the normal wear pattern of the linings would provide a normal life of a lining of between 150 and 300 heats. It is only with extreme care in the operation of the furnace that the life of the lining would exceed 300 heats.

It was discovered, when the furnaces were removed from operation for relining, that a substantial portion of the lining was not worn appreciably and it was only relatively small sections of the furnace lining that had eroded and worn to an extent that it was necessary to reline the entire funrnace.

It has been suggested, in the past, as for example, in U.S. Pat. 3,351,289, to prolong the life of the furnace refractory lining by spraying a suitable refractory slurry on the inner surface of the lining between the heats to build up the worn and eroded portions of the lining and thus prolong the useful life of the refractory lining. The method and apparatus disclosed in U.S. Pat. 3,351,289 has met with limited success in that the life of the lining has been increased by several hundred heats. There are, however, several problems with the method and apparatus disclosed in the above patent. For example, the furnace is required to be down and off line for a substantial period while the aqueous slurry is applied to the lining walls. It is proposed by the hereinafter described method to maintain the furnace on line and rebuild the eroded or worn areas of the refractory lining without any substantial interruption in the use of the furnace for the metal conversion process.

Another problem encountered with the method and apparatus disclosed in U.S. Pat. 3,351,289 is the difficulty in directing the refractory slurry to the particular worn and eroded areas of the refractory lining. The slurry is applied to the refractory lining by means of a nozzle positioned on the end of a boom. The boom is inserted into the furnace and the nozzle, on a swivel connection, is rotated about the furnace axis and the refractory slurry is sprayed onto the refractory lining. The slurry vaporizes the liquid carrier and fills the furnace with a vapor-dust mixture so that it is extremely difficult and at times, impossible to observe the worn or eroded areas on the furnace lining and to direct the slurry to the particular areas. It is, therefore, difficult to determine whether the refractory lining has a uniform thickness after being sprayed with the refractory slurry.

Another problem encountered with the above method and apparatus is the length of time that the nozzle and boom must remain in the furnace to apply the refractory slurry to the furnace lining. Elaborate cooling devices must be provided to prevent the boom and spray pipe from melting while in the furnace.

SUMMARY OF THE INVENTION

The instant invention is directed to a method for selectively applying refractory material to worn or eroded portions of a refractory lining while the vessel and refractory lining are at an elevated operating temperature. Pulverulent or granular refractory material is positioned in selected separate quadrants of separate compartments of a container. The container is secured to the end of a boom and is inserted into the vessel and positioned therein in a manner that the quadrants of the compartments filled with refractory material are positioned opposite the worn or eroded portions of the vessel lining. An explosive force ruptures the frangible wall of the container and propels the refractory material simultaneously from all of the filled quadrants onto the plastic refractory lining where it adheres to the lining and fills the worn and eroded portion of the refractory lining.

A principal object of this invention is to provide a method for selectively applying refractory material to selected portions of a refractory lining.

Another object of this invention is to provide apparatus for selectively discharging pulverulent or granular refractory material to selected portions of a refractory lining.

Another object of this invention is to provide a method for quickly and efficiently building up the worn or eroded portions of a refractory lining without interrupting the operation of the furnace.

These and other objects and advantages of this invention will be more completely disclosed and described in the following specification, the accompanying drawings and the appended claims.

BRIEF DESCRIPTION OF THE DRAWINGS

FIG. 8 is a view in section of the assembled container illustrated in FIG. 5 illustrating the explosive material positioned in the axial passageway formed by the overlying annular compartments.

FIG. 9 is a perspective view of the annular compartments illustrating the inner cylindrical wall and an outer cylindrical wall. The inner cylindrical wall is illustrated as having openings therein for selectively filling the respective quadrants with refractory material.

FIG. 10 is a fragmentary view in perspective illustrating the outer cylindrical wall of the annular segments with perforations therein to permit the perforated portions to fold back and open the outer cylindrical wall upon detonation of the explosive within the central passageway.

FIG. 11 is a fragmentary view of the inner divider walls to form the quadrants within the annular segment and with the openings through the inner cylindrical wall. The relatively thin distortable and frangible plate illustrated in FIG. 12 is positioned in one of the rectangular openings and the relatively rigid plate illustrated in FIG. 13 is positioned in another of the openings.

FIG. 12 is a view in perspective of the relatively thin distortable and frangible plate that is positioned in an opening in the inner cylindrical wall of the segments that are filled with refractory material.

FIG. 13 is a perspective view similar to FIG. 12 illustrating the relatively rigid plates that are positioned in the openings associated with the empty quadrants in the cylindrical segments.

FIG. 14 is a view in side elevation and in section of another embodiment of the invention where the cylindrical compartments include both the explosive and the refractory material.

FIG. 15 is a view in section taken along the lines 15—15 of FIG. 14.

FIG. 16 is a view in section of another embodiment of the invention wherein the gas for propelling the refractory material against the lining is supplied from a source positioned outside of the furnace.

FIG. 17 is a view in section taken along the lines 17—17 of FIG. 16.

FIG. 18 is a view similar to FIG. 1 illustrating the boom member connecting the source of pressurized gas with the container positioned in the furnace.

DESCRIPTION OF THE PREFERRED EMBODIMENTS

Figure 1:
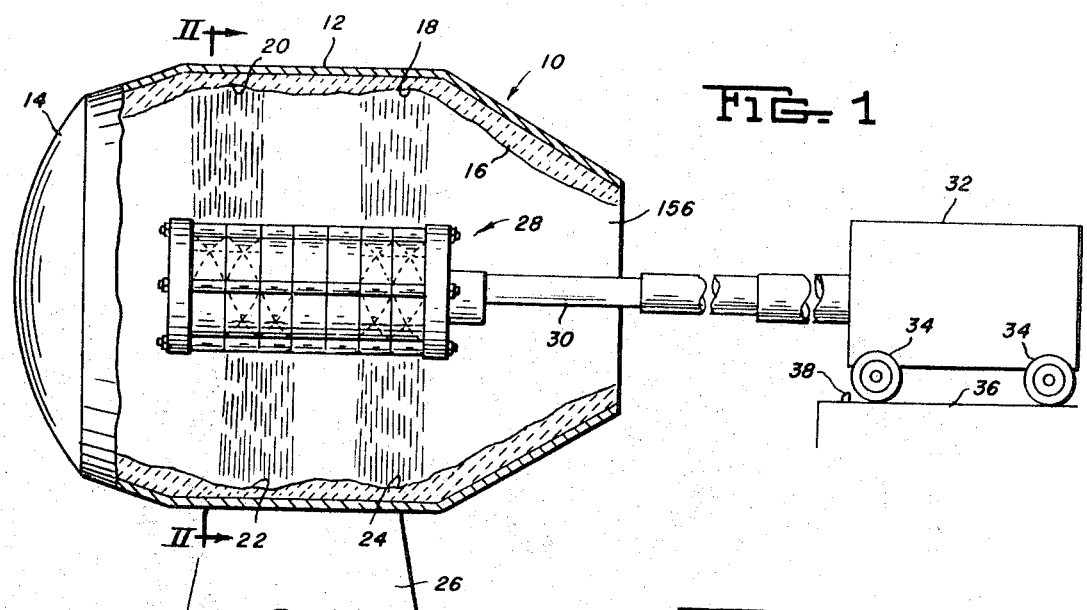
FIG. 1 is a view in side elevation partially in section illustrating the container positioned within a basic oxygen furnace and selectively applying refractory material to portions of the refractory lining.
Figure 2:
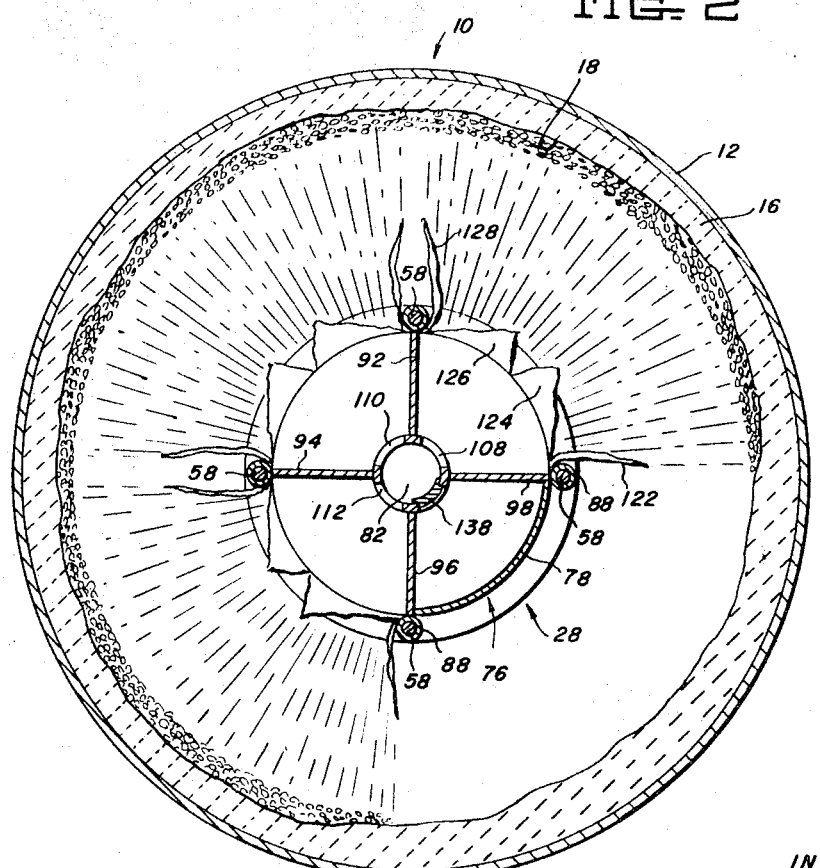
FIG. 2 is a view in section taken along the line 2—2 in FIG. 1 illustrating the manner in which the pulverulent refractory material is selectively applied to portions of the refractory lining within the basic oxygen furnace.

Referring to the drawings and particularly FIGS. 1 and 2, there is illustrated a basic oxygen furnace generally designated by the numeral 10 that has a metal external wall 12 with a dish-shaped base portion 14. The inner surface of the wall 12 is lined with refractory material 16 and worn portions of the refractory lining 16 are designated by the numerals 18, 20, 22 and 24. As later explained, the worn portions illustrated in FIG. 1 are for exemplary purposes only since each basic oxygen furnace has its particular, distinct wear pattern of the refractory lining.

The basic oxygen furnace 10 is suitably supported on trunnions 26 for pivoting to a vertical position, as is well known in the art. A selective refractory applying container or canister generally designated by the numeral 28 is illustrated as being positioned within the basic oxygen furnace and supported therein by a boom member 30 extending from a mobile vehicle or trolley 32. The vehicle 32 has propelling wheels 34 that permit the vehicle to move toward and away from the basic oxygen furnace 10 on the floor of a platform 36. Thus, the vehicle 32 can advance to a given position on the floor of platform 36 which may be marked or indicated by any suitable means such as a marking device 38 or by an automatic stop mechanism at a given location to thus limit inward movement of the container 28 at a selected distance from the base of the furnace 14. The accurate positioning of the container 28 within the furnace 10 is advantageous in that the pulverulent refractory material is applied in the same area to the worn portions of the refractory lining 16. For example, in FIG. 1, the container 28 is accurately positioned within the furnace 10 a predetermined distance from the base of the furnace 14 so that the refractory material is propelled selectively against the worn portions of the lining where the refractory material adheres to the lining and builds up the lining in the worn areas, as illustrated in FIG. 2.

Referring to FIG. 2, which is a sectional view of a portion of the furnace 10, the pulverulent refractory material is being selectively applied to three quadrants of the lining within the furnace that have been worn by the metal conversion process. The remaining quadrant of the furnace at the elevation where the section of FIG. 2 has been taken is not worn and the application of a layer of refractory material to this portion of the furnace is unnecessary.

Figure 3:
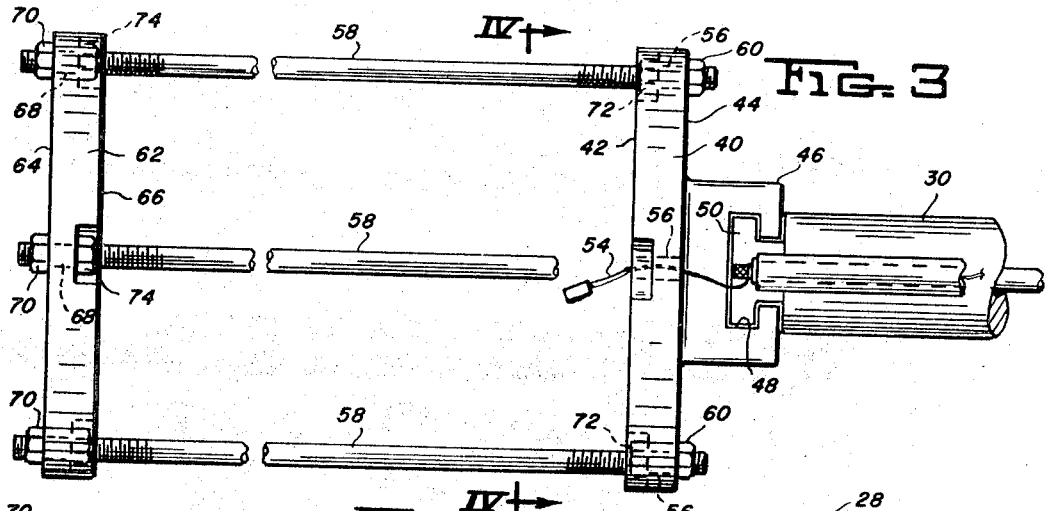
FIG. 3 is a view in side elevation of the support cage for the annular compartments of the container with the refractory and explosive material therein.
Figure 5:
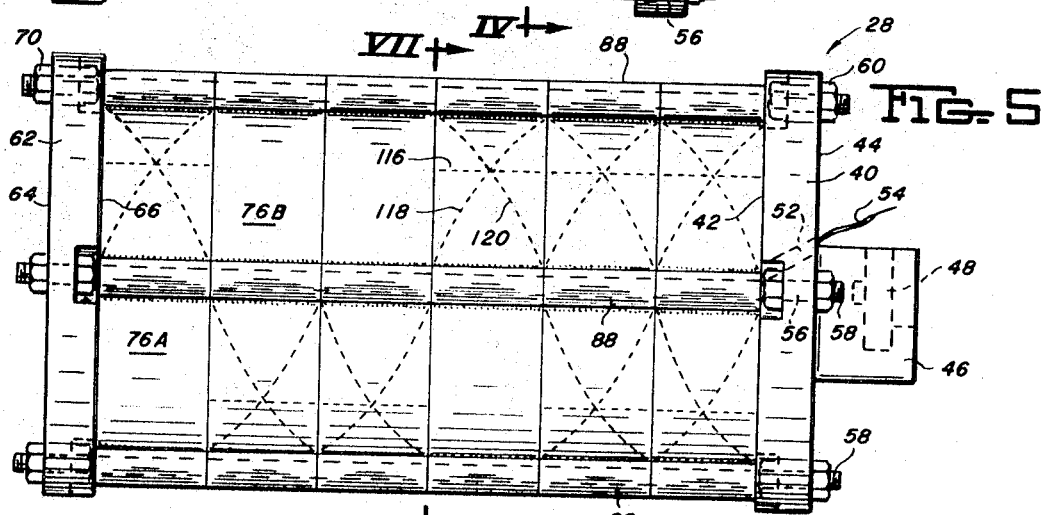
FIG. 5 is a view similar to FIG. 3 illustrating the container that includes a plurality of annular compartments containing the pulverulent refractory material supported by the front and rear bulkheads of the cage member.
Figure 4:
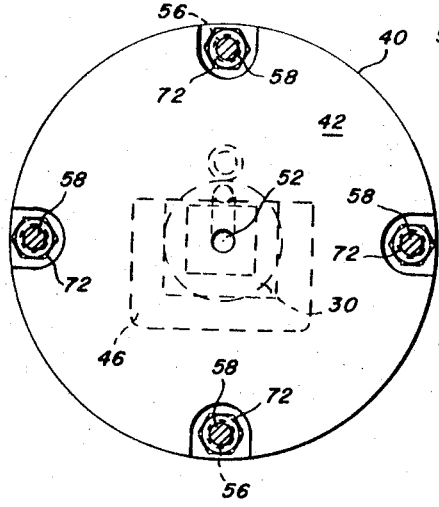
FIG. 4 is a view taken along the lines 4—4 illustrating the rear bulkhead in elevation.

Referring to FIGS. 3–8, the container 28 supported by the boom 30 is illustrated in detail and includes a circular rear bulkhead 40 with a front wall 42 and a rear wall 44 (FIG. 3). A central connecting device 46 extends rearwardly from the bulkhead rear wall 44 and has a T-shaped recess 48 therein. The boom 30 has a matching T-shaped end portion 50 that is positioned within the T-shaped recess 48 to support the rear bulkhead 40 on the end of the boom 30. The bulkhead 40 has a central aperture 52 therethrough for the detonator wire 54 that extends into an axial passageway, as later explained. The rear bulkhead 40 has peripheral apertures 56 therethrough for receiving the ends of rods 58. The rods 58 are threaded at one end and extend through the apertures 56 and are maintained therein by means of bolts 60.

The container 28 has a front bulkhead 62 with a front wall 64 and a rear wall 66. The bulkhead 62 has bolt apertures 68 extending therethrough that are aligned with bolt apertures 56 and the other end of rods 58 extend through the apertures 68 and are secured thereto by means of bolts 70. Both ends of the rods 58 have other bolts 72 and 74 threaded thereon to accurately space the front bulkhead 62 from the rear bulkhead 40 to thus form a cage for a plurality of compartments or segments of the container 28 illustrated in detail in FIGS. 7, 9 and 10.

Referring to FIGS. 9 and 10, each of the compartments generally designated by the numeral 76 is annular in configuration, has an external cylindrical wall 78 and an internal cylindrical wall 80 that forms an axial passageway 82. The compartments 76 also have a bottom end wall 84 and a top end wall 86. Cylindrical support members 88 are secured to the end walls 90° from each other and have a passageway 90 therethrough through which the rods 58 extend when the segments or compartments are assembled on the cage to form the assembled container 28. The inner wall 80 has radially extending ribs 92, 94, 96 and 98 that are secured to the inner surface of outer wall 78, preferably in overlying relation with the support members 88 to form quadrants 100, 102, 104 and 106 within the annular compartments 76. Although the compartments 76 are described as being divided into four equal quadrants by the walls 92, 94, 96 and 98, it should be understood that the compartments can be divided into a greater or lesser number of separate enclosures for the refractory material.

The inner wall 80 has a first rectangular opening 108 providing an access opening from the axial passageway 82 into the enclosed quadrant 100. The inner wall 80 has other openings 110, 112 and 114 providing access openings into the quadrants or enclosure 102, 104 and 106. Thus, each of the segments illustrated includes four separate enclosures or quadrants 100 that are formed by the vertical divider wall 92, 94, 96 and 98, the inner wall 80, the outer wall 78 and the top and bottom walls 84 and 86.

The compartment top and bottom walls 84, 86, inner cylindrical wall 80 and dividers 92, 94, 96 and 98 are so fabricated from material and so dimensioned that they resist distortion or bending when subjected to sudden high gas pressures are present when an explosive is detonated within the annular passageway 82.

The outer peripheral wall 78 may be fabricated from a relatively thin preferably metallic material that is frangible and will readily shear and bend when subjected to high gas pressures, especially when the outer peripheral wall 78 is perforated. The outer peripheral wall 78, however, is capable of withstanding the elevated temperatures within a basic oxygen furnace for a sufficient period of time to be positioned within the furnace and to discharge and distribute the refractory material to selected portions of the refractory lining 16.

The portions of the outer cylindrical wall 78 that enclose the quadrants filled with refractory material are preferably perforated both axially along the line 116 and diagonally along the lines 118 and 120 so that the portion of the outer cylindrical wall 78 overlying the quadrants containing the refractory material will tear or part along the perforations and bend in the manner illustrated in FIG. 2 by the bent portions of outer wall 78 indicated by the numerals 122, 124, 126 and 128 for a single quadrant.

Figure 6:
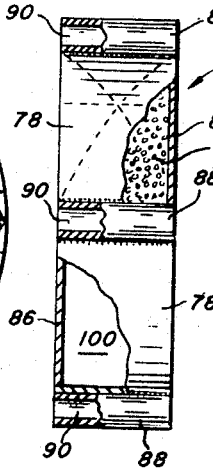
FIG. 6 is a view in side elevation partially broken away to illustrate one of the annular compartments in which one quadrant is filled with refractory material and the other quadrant is empty.
Figure 7:
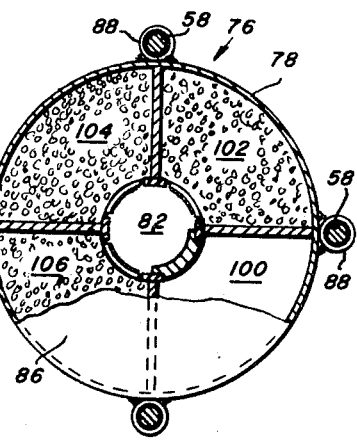
FIG. 7 is a view taken along the lines 7—7 of FIG. 5 illustrating an annular compartment having three quadrants filled with refractory material and one quadrant empty.

As illustrated in FIG. 6, the portion of the outer wall 78 that encloses an empty quadrant, that is a quadrant not filled with refractory material, is preferably not perforated to thereby restrain the release of the explosive gasses through the empty quadrants should the high pressure gas pass through the opening in the inner annular wall 80. Although the outer cylindrical wall 78 has been described as a unitary structure enclosing all four quadrants, it should be understood that the outer cylindrical wall may be fabricated from segments to enclose only a single quadrant and be suitably secured to the upper and lower walls 84 and 86. FIGS. 6 and 7 illustrate a segment 76 with the quadrants 102, 104 and 106 filled with the refractory material and quadrant 100 empty. The portions of the external wall 78 enclosing quadrants 102, 104 and 106 are perforated and the portion enclosing empty quadrant 100 is not perforated.

Referring to FIGS. 11, 12 and 13, the closures for the openings 108, 110, 112 and 114 are illustrated. There are two types of covers or closures utilized to close the openings 108, 110, 112 and 114, dependent on whether the associated quadrant is empty or filled with refractory material. FIG. 12 illustrates the cover generally designated by the numeral 130 that has a body portion 132 with the same curved configuration as the inner wall 80. The body portion 132 has a peripheral downwardly extending flange 134 with a rebent upwardly extending end portion 136. The cover 130 is preferably fabricated from a relatively thin and preferably resilient material so that the rebent portions 136 are compressed when the cover 130 is positioned within the respective openings, as, for example, opening 114 in FIG. 11. It should be understood, however, that any cover is suitable that will retain its position in the opening 114 and support the refractory within the quadrants as the device 28 is rotated to fill the selected quadrants with refractory material or support the refractory material within the quadrant as the device is inserted in the furnace 10 and will either bend, distort or tear to permit the gasses to flow into the quadrant when subjected to the high pressure gasses formed by the explosive.

A second cover generally designated by the numeral 138 and illustrated in FIG. 13 is preferably fabricated of a relatively rigid material that will withstand the gas pressures generated by the explosive within passageway 82 and maintain the rectangular openings in the inner cylindrical wall 80 closed to prevent the high pressure gas from passing into the empty quadrants. The cover 138 has an arcuate body portion 140 that conforms with the arcuate configuration of the inner cylindrical wall 80. The body portion 140 has a shoulder portion 142 that abuts the inner cylindrical wall 80, as illustrated in FIG. 11. The body portion 140 has a depending arcuate portion 144 that extends into the rectangular opening in wall 80 and has ribs 146 therein that frictionally engage the cover 138 within the respective opening in the cylindrical wall 80.

Referring to FIG. 8, the assembled container 28 is illustrated with a plurality of segments or compartments 76 positioned in overlying aligned relation to each other with rods 58 extending through the openings 90 in the cylindrical support members 88. For convenience, the particular segment 76 will be distinguished by alphabetical designations. The segment 76A is adjacent the front bulkhead 62 and segment 76B is adjacent to segment 76A and the respective passageways 82 are axially aligned. The segments 76C, 76D, 76E and 76F are similarly positioned in overlying relation with the axial passageway 82 aligned to form a common axial passageway within the container 28 between the front bulkhead 62 and rear bulkhead 40. The segment 76F is adjacent to the rear bulkhead 40 and the nuts 60 and 70 on bolts 58 are tightened to form a unitary canister structure 28 that includes the separate segments 76A, 76B, 76C, 76E and 76F.

It should be understood that a greater or lesser number of segments may be included as a part of the canister 28 depending on the requirements of the particular furnace 10. Also, the height of thickness of the segments 76 may be modified for the particular type of selective refractory distribution required within each furnace.

The segments 76 preferably have the preselected quadrants filled with the refractory and the covers 130 are positioned thereon to close the openings, as previously discussed. The covers 138 are applied to the openings of the empty quadrants. The segments are then assembled on the rear bulkhead 40 with rods 58 extending through the passageways 90, as previously discussed. After the desired number of segments 76 are positioned on the rods 58, an explosive 158, preferably a bagged explosive, is positioned in the common axial passageway formed by the passageways 82 of the respective segments 76. A detonator 154 is positioned within the bagged explosive and connected to the detonator wire 54 that extends through an opening 52 in the rear bulkhead 40. The front bulkhead 62 is then secured to the rods 58 to form a unitary container 28. The container 28 is then connected to the end of boom 30 and is ready to be inserted within the basic oxygen furnace 10.

After the basic oxygen furnace 10 has poured a heat after the conversion process and the slag is dumped, the furnace is then rotated to an upright charging position on the trunnions 26. To apply the refractory material to the lining, the vessel is stopped at a substantially horizontal position, as illustrated in FIG. 1. The vehicle 32 with the boom 30 extending forwardly therefrom advances toward the furnace 10 and the container 28 enters the furnace 10 through the top opening 156. The vehicle 32 is advanced until it reaches the stop 38 on the floor of platform 36. The temperature of the refractory within the furnace is at substantially the temperature of the recently poured molten metal, i.e., between 2800° F. and 3000° F. After the vehicle reaches the stop 38 on the platform floor 36, electrical energy is supplied through the wire 54 to the detonator 154 within the explosive 158 positioned in the common axial passageway 82 of segments 76.

The explosive 158 is thus detonated to provide a rapid increase in gas pressure within the annular passageway 82. The gas pressure causes the frangible covers 130 to distort and permit the gas to pass into the quadrant containing the pulverulent refractory material. This gas explosively forces the refractory material against the outer cylindrical wall 78 of the quadrants filled with the refractory material and tears and bends the perforated portions of the outer cylindrical walls 78 to provide openings therein through which the pulverulent refractory material is propelled selectively against portions of the refractory lining 16 within the furnace 10.

The refractory lining 16 is at the above discussed elevated temperature of between 2800° F. and 3000° F. and is in a viscous molten state. The pulverulent refractory material propelled against this hot viscous refractory lining impinges on and adheres to the lining to form a layer of refractory material thereon, as illustrated in FIG. 2. A minimum rebound of the pulverulent refractory is experienced because of the high temperature of the furnace lining and the viscous wet and sticky condition of the refractory at this elevated temperature.

Any of the conventional pulverulent refractory materials may be utilized to build up the furnace lining, depending on the type of lining present in the furnace. The refractory may include chrome magnesite, magnesite-chrome compounds or solely magnesite. Fused magnesite, burnt lime, low flux dolomite and dolomite can be used. This apparatus may also be employed to introduce fluospar and flux into the vessel. Where desired, suitable binders, as for example, tar, pitch, other organic compounds that readily liquefy at the elevated temperatures experienced within the furnace to form a binder, or inorganic materials that have a melting point below that of the refractory and do not contaminate the metal during the reduction process may be used. Where desired, materials other than refractories, such as additive materials for the metal reduction process, for example, lime or the like, may also be included in particular quadrants of the respective segments 76A, 76B, 76C, 76D, 76E and 76F.

The explosive that may be employed to provide the high pressure gas within the annular passageway 82 may either be a molecular explosive such as well known molecular explosives, i.e., trinitrotoluene or nitrocellulose compounds. The molecular explosives may include inert diluents, depending upon the explosive force required. The known non-molecular explosives such as admixtures of ammonium nitrate and carbonaceous materials such as fuel oil and the like, may also be employed. The principal requirement of the explosive is that it remain inert when positioned in the furnace at the elevated temperature for a sufficient period of time to be controllably detonated by the detonator 154 after the canister reaches the desired position within the furnace 10.

Where desired, the explosive selected may have the property of remaining inert until a given elevated temperature is reached and above the given temperature to detonate. With this type of explosive, the detonator 154 would be eliminated and sufficient time would be available to position the container 28 within the furnace 10 before the explosive would attain the given elevated temperature and detonate.

It will be apaprent, with the above described canister 28, that it is now possible to selectively apply layers of refractory material to portions of the furnace lining to thereby build up the furnace lining and increase the life of the lining so that relining of the furnace is not required for substantially longer periods of time. One of the advantageous features of the above described apparatus is the rapidity of the coating process. The container 28 is prepared while the refining process for the previous heat is taking place. After the molten metal is poured from the furnace, the furnace is moved to the position illustrated in FIG. 1 and the vehicle 32 with the container 28 secured to the boom 30 is rapidly advanced so that the container 28 is quickly positioned within the furnace 10. The explosive 158 is then detonated to selectively propel the pulverulent refractory material against the furnace lining 16. The vehicle 32 then quickly retracts the container from the furnace 10 and the furnace 10 with the built-up lining is then rotated to a vertical position for charging for the next heat. With the herein described process it is now possible to quickly and efficiently apply a layer of refractory material to eroded or worn portions of the furnace refractory lining without interrupting appreciably the sequence of operation.

Referring to FIGS. 14 and 15 another embodiment of the refractory applying device is illustrated and is generally designated by the numeral 170. The refractory applying device includes a rear bulkhead 172 and a front bulkhead 174. Positioned between the bulkheads 172 and 174 are a plurality of annular segments 176, 178 and 180 to form a container that is inserted into the furnace 10 in a manner similar to the container previously described.

The annular segment 176 is illustrated in FIG. 15 and includes quadrants 182, 184, 186 and 188 with radially extending dividers 190, 192, 194 and 196 that connect an inner annular ring 198 with an outer anular ring 200 and form the previously described quadrants therebetween.

The annular ring 198 includes radially extending passageways 202, 204, 206 and 208 that are aligned with similar passageways in an axial tubular member 210 positioned between the bulkheads 172 and 174. Within the quadrants 182, 184 and 186, there are arcuate plate members 212, 214, 216 that divide the quadrants into an inner section for explosive material and an outer section for the refractory material as, for example, in quadrant 182, the inner section 218 enclosed by the arcuate member 212 includes a suitable explosive material and the section 220 includes the refractory material that is propelled against the furnace lining. A detonator 222 is positioned in the explosive within the section 218 and has a detonator cord 224 extending into the inner portion of the tubular member 210. Similarly, the other quadrants that include both the refractory material and the explosive have a similar detonator cord 224 extending into the internal portion of the member 210 where they are connected to a common conductor 226 that extends through a conduit 228 to the external portion of the boom where it is connected to as suitable source of energy to energize the detonators 222 and detonate the explosives within the various quadrants. The detonators are arranged to detonate the explosive in the various segments substantially simultaneously to thereby propel the refractory material against the furnace wall in a manner similar to that previously described. With the arrangement illustrated in FIGS. 14 and 15, each of the quadrants charged with the refractory material also includes an explosive charge to propel the refractory material against the furnace lining.

Referirng to FIGS. 16, 17 and 18, there is illustrated another embodiment of the invention wherein gas under pressure positioned externally of the furnace is conveyed through the boom member to receiving apertures within the canister and are arranged to propel the refractory material and the backing plate against the refractory lining.

Refering to FIG. 18, the canister generally designated by the numeral 300 is secured to the end of the boom 302 that has an axial passageway 304 extending therethrough. The other end of the boom 302 is connected to a trolley 306 that is mounted on propelling wheels 308 and is arranged to move toward and away from the furnace on the surface 312 in a manner similar to the trolley 32 previously described. Positioned on the trolley 306 is a source of gas under pressure generally designated by the numeral 314. The container housing the gas under pressure has its outlet connected through a suitable valve 316 to a conduit 318 extending through the axial passageway in the boom 302. With this arrangement, gas under pressure is conveyed to the internal portion of the container 300 from a source located externally of the furnace 10.

The container 300 is similar in many respects to the previously described containers in that it includes a rear bulkhead 320 and a front bulkhead 322 that secures a plurality of annular segments 324 therebetween. The boom member 302 extends into the container 300 and has a plurality of radial apertures 326 that are in overlying relation with similar apertures 328 in the inner annular wall of each of the annular segments 324. Thus, the pressurized gas introduced through the conduit 318 enters the inner portion of the container 300 through the end of boom 302 and is propelled through the radial apertures 326 into the annular segments through the aligned apertures 328.

Within the annular segments 324 there are a plurality of quadrants 330 similar to the quadrants previously described in the other embodiments with the radially extending rib members 332. In the embodiments illustrated in FIGS. 16, 17 and 18, however, there is provided an arcuate plate 334 in each of the quadrants. The arcuate plates 334 are arranged under the force exerted by the pressurized gas to propel the pulverulent material against the furnace wall.

It will be apparent, with the above described embodiments that it is now possible to rapidly apply refractory material to the worn or eroded portions of the refractory lining.

It should be understood that the refractory material may be either pulverulent or granular and have a size ranging from less than 325 mesh Tyler Standard Screen to particles having a size of about one-half inch. Suitable refractory materials for use with the instant invention are described in the following United States Pats.: 3,355,528; 3,093,497; 3,333,840 and the patents discussed in United States Pat. 3,351,460.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method of selectively projecting particulate refractory material against preselected portions of the refractory lining on the side walls of said vessel while the refractory lining is at an elevated operating temperature to thereby replace the worn portions of the refractory side walls comprising, positioning particulate refractory material in a container having a longitudinal axis and a plurality of adjacent compartments, each of said compartments having a plurality of sections, retaining said particulate material in said container with a frangible cover means, inserting said container into a vessel with said container longitudinal axis substantially aligned with the longitudinal axis of said vessel at a predetermined distance from the base of said vessel so that said particulate refractory material in said adjacent compartments of said container is positioned opposite the worn portions of the vessel refractory lining side walls while said vessel is at an elevated operating temperature, and subjecting said particulate material in said adjacent compartments of said container to gas under pressure to thereby fracture preselected portions of said cover of said container and propel said particulate refractory material from said adjacent compartments of said container in preselected directions substantially transverse to the longitudinal axis of said container and against different portions of the refractory lining of said vessel side walls so that said particulate refractory material bonds to the refractory lining of said vessel side walls.

2. A method of selectively projecting particulate refractory material against preselected portions of the refractory lining of a vessel as set forth in claim 1 which includes, selectively positioning particulate refractory material in preselected sections of said compartments of said container so that said refractory material is propelled at different elevations from said container and at different angular directions from said sections of said container compartments.

3. A method of selectively projecting particulate refractory material against preselected portions of the refractory lining of a vessel as set forth in claim 2 which includes, simultaneously propelling said particulate refractory material from said preselected sections of said compartments of said container to thereby simultaneously bond said particulate refractory material to different portions of said refractory lining.

References Cited
UNITED STATES PATENTS

| | | | |
|---|---|---|---|
| 1,479,507 | 1/1924 | Kernohan et al. | 264—30 |
| 1,529,219 | 3/1925 | Schaab | 264—30 |
| 1,750,864 | 3/1930 | Schieldrop | 264—30 |
| 1,780,120 | 10/1930 | Duckham | 264—30 |
| 3,351,460 | 11/1967 | Demaison | 264—30 |
| 3,518,330 | 6/1970 | Demaison | 264—30 |

DONALD J. ARNOLD, Primary Examiner

JOHN H. MILLER, Assistant Examiner

U.S. Cl. X.R.

264—84